(12) United States Patent
Takahashi (10) Patent No.: US 11,203,075 B2
(45) Date of Patent: Dec. 21, 2021

(54) ELECTRIC DISCHARGE MACHINING APPARATUS

(71) Applicant: Sodick Co., Ltd., Kanagawa (JP)

(72) Inventor: Jun Takahashi, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 318 days.

(21) Appl. No.: 16/445,827

(22) Filed: Jun. 19, 2019

(65) Prior Publication Data
US 2019/0388988 A1    Dec. 26, 2019

(30) Foreign Application Priority Data

Jun. 22, 2018  (CN) .......................... 201810647817.6

(51) Int. Cl.
  *B23H 1/04*  (2006.01)
  *B23H 1/02*  (2006.01)

(52) U.S. Cl.
  CPC .............. *B23H 1/028* (2013.01); *B23H 1/04* (2013.01)

(58) Field of Classification Search
  CPC . B23H 1/08; B23H 1/028; B23H 1/04; B23H 7/265
  See application file for complete search history.

(56) References Cited

U.S. PATENT DOCUMENTS

| | | | | |
|---|---|---|---|---|
| 3,553,415 A | * | 1/1971 | Girard ...................... | B23H 1/08 219/69.14 |
| 3,939,321 A | * | 2/1976 | Bertrand ................ | B23H 9/001 219/69.14 |
| 4,491,714 A | * | 1/1985 | Inoue ....................... | B23H 1/08 219/69.14 |
| 6,448,528 B1 | | 9/2002 | Yoshida | |
| 7,518,081 B2 | * | 4/2009 | Miyake .................... | B23H 1/10 219/69.15 |
| 2007/0205184 A1 | | 9/2007 | Mazumder et al. | |

(Continued)

FOREIGN PATENT DOCUMENTS

| CN | 101264535 A | 9/2008 |
|---|---|---|
| CN | 103551688 A | 2/2014 |
| CN | 204159994 U | 2/2015 |

(Continued)

OTHER PUBLICATIONS

Chinese Office Action dated Aug. 28, 2019, in connection with corresponding CN Application No. 201810647817.6 (12 pgs., including English translation).

(Continued)

*Primary Examiner* — Geoffrey S Evans
(74) *Attorney, Agent, or Firm* — Maier & Maier, PLLC (57) ABSTRACT

An electric discharge machining apparatus includes a tool electrode that performs electric discharge machining to a workpiece, a tubular extended guide in which the tool electrode is inserted, a long nozzle in which the tool electrode is inserted with a tip protruded, and provided along an outer wall surface of the extended guide so as to provide mist generating space between the extended guide and the long nozzle, a compressed gas supplying device supplying compressed gas into the mist generating space, and a pressurized working fluid supplying device supplying pressurized working fluid into working fluid filling space between the tool electrode and the extended guide.

7 Claims, 5 Drawing Sheets

(56) References Cited

U.S. PATENT DOCUMENTS

2014/0144884 A1* 5/2014 Suzuki ............... B23H 1/10
219/69.11

FOREIGN PATENT DOCUMENTS

| CN | 106825798 A | 6/2017 |
|---|---|---|
| EP | 1 138 428 A1 | 10/2001 |
| JP | 2004-230506 A | 8/2004 |
| JP | 2006-102828 A | 4/2006 |
| JP | 4027770 B2 | 12/2007 |
| JP | 2010-221391 A | 10/2010 |
| JP | 2013-173199 A | 9/2013 |

OTHER PUBLICATIONS

British Search Report dated Dec. 10, 2019, in connection with corresponding GB Application No. 1908856.6; 3 pages.

Wataru Natsu et al., "Realization of High-speed Micro EDM for high-aspect-ratio micro hole with mist nozzle", 2016 JSPE Autumn Conference, Sep. 6, 2016, pp. 167-168, including partial Englsih-language translation.

Ryota Nakamura et al. ,"Investigation of effect of machining liquid supply method and verification of effect of mist nozzle in micro deep hole electric discharge machining", The 24th Society of Precision Engineering Student Member Graduation Research Presentation Lecture Proceedings, Mar. 6, 2017, pp. 117-118, including partial English-language translation.

Wataru Natsu et al., "Realization of high-speed micro EDM for high-aspect-ratio micro hole with mist nozzle", 19th CIRP Conference on Electro Physical and Chemical Machining, Apr. 23-27, 2018, pp. 575-577.

* cited by examiner

ELECTRIC DISCHARGE MACHINING APPARATUS

CROSS-REFERENCE TO RELATED APPLICATION

This application claims priority to Chinese Patent Application, CN201810647817.6 filed on Jun. 22, 2018, the entire contents of which are incorporated by reference herein.

TECHNICAL FIELD

The present invention relates to an electric discharge machining apparatus for machining a workpiece by moving a tool electrode with an electric discharge generated between the workpiece and the tool electrode, and in particular to an electric discharge machining apparatus which performs machining with mist sprayed to a machining portion of the workpiece in the air.

BACKGROUND ART

The electric discharge machining apparatus arranges the tool electrode and the workpiece with a predetermined gap, applies voltage between the tool electrode and the workpiece, and generates discharge. And the tool electrode and the workpiece are moved relative to each other so as to machine the workpiece into a desired shape.

Patent Literature 1 discloses aerial electric discharge machining apparatus that performs electric discharge machining in the air. In this aerial discharge machining apparatus, compressed air is ejected from a small hole tool electrode and flows along the side surface of the small hole tool electrode. And by arranging two liquid mist ejecting nozzles on both sides of the small hole tool electrode and at positions away from the machining portion, and by ejecting the mist from the liquid mist ejecting nozzle, the workpiece is machined with shavings which is generated during electric discharge machining removed.

CITATION LIST

Patent Literature

Patent Literature 1: JP2006-102828A

SUMMARY OF INVENTION

Technical Problem

However, in general, the diameter of the small hole tool electrode is very small, and the amount of compressed air ejected from the small hole tool electrode and flowing along the side surface of the small hole tool electrode described in Patent Literature 1 is also very small. In addition to that, by gas, it is difficult to remove shavings as compared to liquid and the like. Furthermore, in the aerial electric discharge machining apparatus described in Patent Literature 1, since mist is ejected from two liquid mist ejecting nozzle arranged on both sides of the small hole tool electrode and at positions away from the machining portion, the mist don't reach the machining portion and the shavings cannot be sufficiently removed when the deep portion of the workpiece is machined.

The present invention has been made in consideration of the afore-mentioned circumstances. An object of the present invention is to provide an electric discharge machining apparatus capable of sufficiently removing shavings in aerial electric discharge machining.

Solution to Problem

The electric discharge machining apparatus of the first aspect of the present invention comprises a tool electrode that performs electric discharge machining to a workpiece, a tubular extended guide in which the tool electrode is inserted, a long nozzle in which the tool electrode is inserted with a tip protruded, and being provided along an outer wall surface of the extended guide so as to provide mist generating space between the extended guide and the long nozzle, a compressed gas supplying device for supplying compressed gas into the mist generating space, and a pressurized working fluid supplying device for supplying pressurized working fluid into working fluid filling space between the tool electrode and the extended guide, wherein the extended guide includes pressurized working fluid supplying openings penetrating a wall of the extended guide, the pressurized working fluid supplying openings are disposed at equal angular interval in a circumferential direction of the wall, and the pressurized working fluid supplied from the working fluid filling space into the mist generating space through the pressurized working fluid supplying openings is mixed with the compressed gas in the mist generating space so that the pressurized working fluid is atomized to be ejected as mist.

In this invention, the pressurized working fluid supplying opening penetrating the wall of the extended guide is provided, and two or more pressurized working fluid supplying openings are provided at equal angular interval in the circumferential direction of the wall of the extended guide. Thereby, pressurized working fluid can be supplied into the mist generating space uniformly in the circumferential direction of the wall of the extended guide. As a result, the mist can be uniformly generated in the mist generating space and can be ejected without deviation along the tool electrode, and shavings in the vicinity of the tip of the tool electrode where the electric discharge machining is performed are reliably removed.

Further, the pressurized working fluid is filled in the working fluid filling space between the tool electrode and the extended guide. Therefore, the tool electrode can be effectively cooled by the pressurized working fluid filled in the working fluid filling space. Thereby, the temperature increase of the tool electrode during electric discharge machining can be suppressed, and consumption of the tool electrode can be suppressed.

According to the second aspect of the present invention, the electric discharge machining apparatus according to the first aspect further comprises a plurality of dies supporting the tool electrode, wherein a first die of the dies is disposed at an end in the longitudinal direction of the extended guide, which is the side from which the mist is ejected, and between the tool electrode and the first die, a first gap is provided from which the pressurized working fluid in working fluid filling space is ejected.

In this invention, the electric discharge machining apparatus further comprises a plurality of dies supporting the tool electrode, wherein the first die of the dies is disposed at an end in the longitudinal direction of the extended guide, which is a side from which the mist is ejected, and between the tool electrode and the first die, the first gap is provided from which the pressurized working fluid in working fluid filling space is ejected. As a result, the pressurized working fluid in the working fluid filling space can be ejected into the mist generating space from the first gap between the tool electrode and the first die. Thus, the pressurized working fluid in the working fluid filling space can be used for mist generation. Further, the tool electrode projected from the end of the extended guide can be cooled by pressurized working fluid, in addition to the cooling in the working fluid filling space.

According to the third aspect of the present invention, the electric discharge machining apparatus according to the second aspect further comprises a plurality of dies supporting the tool electrode, wherein a second die of the dies is disposed at the end in the longitudinal direction of the extended guide, which is the opposite side to the side from which the mist is ejected, and between the tool electrode and the second die, a second gap is provided from which the pressurized working fluid in working fluid filling space is ejected.

In this invention, the electric discharge machining apparatus further comprises a plurality of dies supporting the tool electrode, wherein the second die of the dies is disposed at an end in the longitudinal direction of the extended guide, which is an opposite side from which the mist is ejected, and between the tool electrode and the second die, the second gap is provided from which the pressurized working fluid in working fluid filling space is ejected. Thus, the pressurized working fluid can be ejected from the second gap between the tool electrode and the second die. As a result, the tool electrode projected from the other end in the longitudinal direction of the extended guide can be cooled by pressurized working fluid, in addition to the cooling in the working fluid filling space.

According to the fourth aspect of the present invention, the electric discharge machining apparatus according to the third aspect further comprises a plurality of dies supporting the tool electrode, wherein a third die of the dies is disposed between the pressurized working fluid supplying opening and an end in the longitudinal direction of the extended guide, which is an opposite side to a side from which the mist is ejected, and a notch is provided on the outer wall surface of the one die that acts as a flow path for pressurized working fluid.

In this invention, a plurality of dies supporting the tool electrode, wherein the third die of the dies is disposed between the pressurized working fluid supplying opening and an end in the longitudinal direction of the extended guide, which is an opposite side from which the mist is ejected, and a notch is provided on the outer wall surface of the one die that acts as a flow path for pressurized working fluid. As a result, it is possible to prevent deflection of the tool electrode generated during the electric discharge machining. Further, the pressurized working fluid can flow downward through the notch, the flow of the pressurized working fluid toward the pressurized working fluid supplying opening can be smoothed.

According to the fifth aspect of the present invention, in the electric discharge machining apparatus according to the first aspect, the compressed gas is air.

Here, for example, when the compressed gas is oxygen, the workpiece is burnt violently with the electric discharge machining. As a result, the processing can be advanced quickly, but the cost is increased. Also, for example, when the compressed gas is nitrogen, combustion is suppressed and the processing speed is reduced.

In this invention, the compressed gas is air. As a result, processing can be performed at a certain speed or more, and the cost required for compressed gas can be reduced.

According to the sixth aspect of the present invention, in the electric discharge machining apparatus according to the first aspect, the pressurized working fluid is water.

In this invention, the pressurized working fluid is water. As a result, the tool electrode can be cooled efficiently, and consumption of the tool electrode can be suppressed. Moreover, the cost required for the pressurized working fluid can be reduced.

According to the seventh aspect of the present invention, in the electric discharge machining apparatus according to the first aspect, the tool electrode is coaxially rotated during electric discharge machining.

In this invention, the tool electrode is coaxially rotated during electric discharge machining. As a result, it is possible to prevent deflection of the tool electrode generated during the electric discharge machining. Moreover, the mist ejected from mist generating space can be diffused more uniformly.

Advantageous Effects of Invention

According to the present invention, in the circumferential direction of the wall of the extended guide, the pressurized working fluid can be supplied into the mist generating space without deviation. As a result, the mist can be uniformly generated in the mist generating space and can be ejected without deviation along the tool electrode, so that shavings in the vicinity of the tip of the tool electrode where the electric discharge machining is performed are reliably removed.

DESCRIPTION OF EMBODIMENTS

Hereinafter, the embodiments of the present invention will be described with reference to the drawings.

Figure 1:
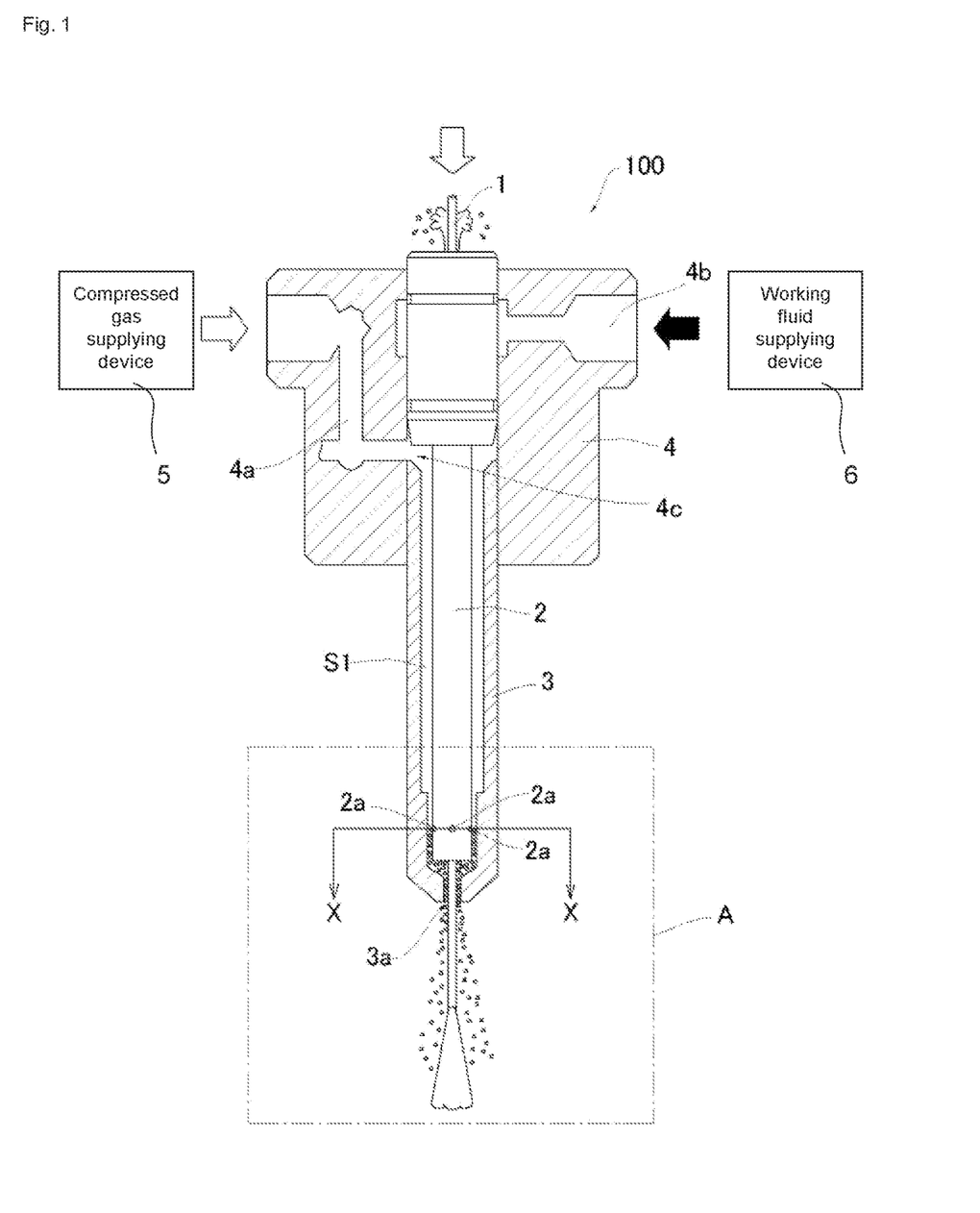
FIG. 1 is a view showing an outline of an electric discharge machining apparatus according to an embodiment of the present invention.
Figure 2:
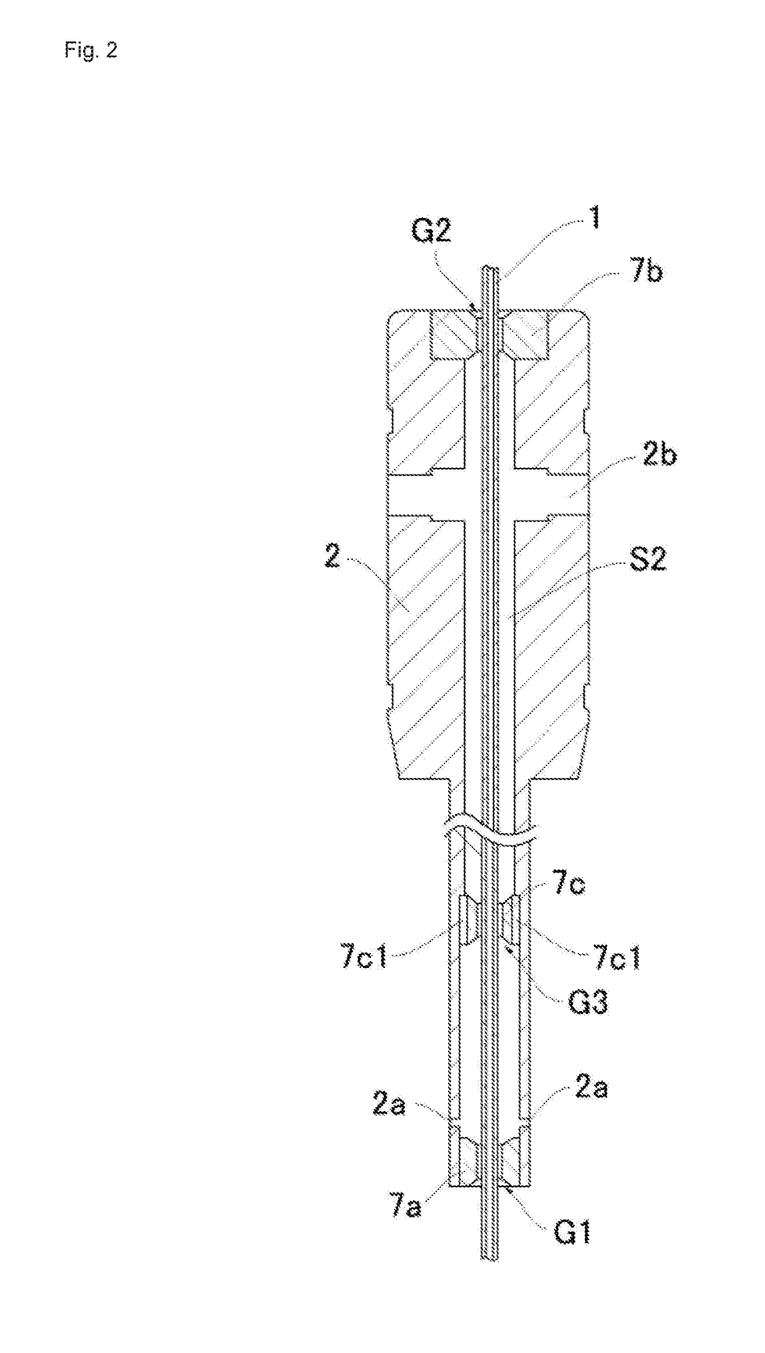
FIG. 2 is a cross-sectional view of an extended guide in which a tool electrode is inserted.

As shown in FIG. 1, the electric discharge machining apparatus 100 performs electric discharge machining with spraying mist to a machining portion of a workpiece (not shown). The electric discharge machining apparatus 100 includes a tool electrode 1, an extended guide 2, a long nozzle 3, a housing 4, a compressed gas supplying device 5, and a pressurized working fluid supplying device 6 and the like. The tool electrode 1 generates discharge by applying voltage between the tool electrode 1 and the workpiece. The tool electrode 1 is inserted into the extended guide 2. The long nozzle 3 is provided along the outer peripheral surface of the extended guide 2 and form mist generating space S1 with the extended guide 2. The housing 4 holds the extended guide 2 and the long nozzle 3. The compressed gas supplying device 5 supplies compressed gas into the mist generating space S1 via the first flow path 4a provided in the housing 4. As shown in FIG. 2, the pressurized working fluid supplying device 6 supplies the pressurized working fluid into the working fluid filling space S2 between the tool electrode 1 and the extended guide 2 via the second flow path 4b provided in the housing 4. The white arrow of FIG. 1 is shown the compressed gas flowing from the compressed gas supplying device 5, and the black arrow of FIG. 1 is shown the pressurized working fluid flowing from the pressurized working fluid supplying device 6.

The tool electrode 1 is a cylindrical pipe electrode in which a hollow hole is provided. The outer diameter of the tool electrode 1 is, for example, 0.3 to 3.0 mm. During electric discharge machining, the tool electrode 1 is coaxially rotated by a rotary drive (not shown). Further, compressed gas is supplied from the compressed gas supplying device 5 into the hollow hole of the tool electrode 1 and is ejected to the machining portion of the workpiece. The tool electrode 1 is inserted into the extended guide 2 with at least the tip protruded.

Figure 3:
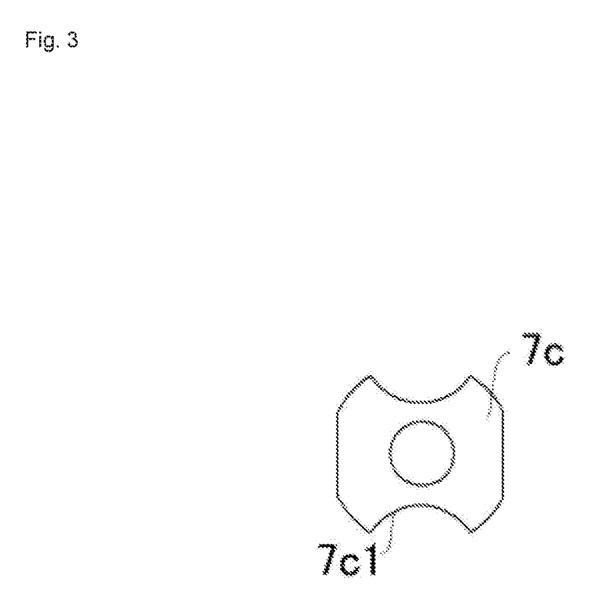
FIG. 3 is a top view of a die attached to an intermediate portion in the longitudinal direction of the extended guide.

As shown in FIG. 2, the extended guide 2 has a substantially tubular shape provided with working fluid filling space S2 which is a through hole in which the tool electrode 1 is inserted. The extended guide 2 is provided with a connecting path 2b for connecting the working fluid filling space S2 with the second flow path 4b provided in the housing 4. The pressurized working fluid supplied from the pressurized working fluid supplying device 6 flow through the second flow path 4b and the connecting path 2b, and the working fluid filling space S2 is filled with the pressurized working fluid. A first die 7a and a second die 7b are attached to the upper end and the lower end of the working fluid filling space S2 respectively to seal them, so that pressurized working fluid in the working fluid filling space S2 does not leak much, and tool electrode 1 is surrounded to be supported. Similarly, a third die 7c for supporting the tool electrode 1 is attached also to the central portion in the longitudinal direction of the working fluid filling space S2. As shown in FIG. 3, the third die 7c is provided with a notch 7c1 on the outer wall surface, which acts as a flow path of the pressurized working fluid. The gaps G1, G2, and G3 are provided between the dies 7a, 7b, 7c and the tool electrode 1, respectively. As a result, it is possible to eject pressurized working fluid along the tool electrode 1 protruding from the upper and the lower end of the extended guide 2 during electric discharge machining. Here, the size of the gaps G1, G2, and G3 is, for example, 0.0025 to 0.010 mm.

Figure 4:
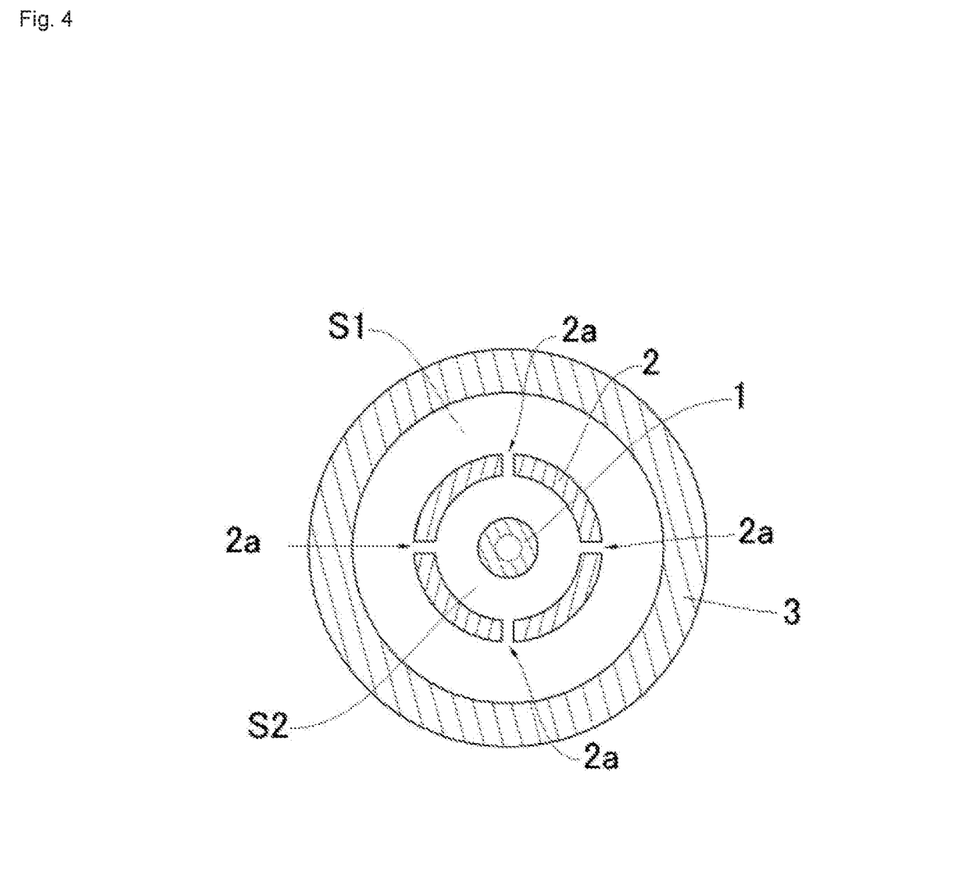
FIG. 4 is a cross-sectional view taken along line X-X in FIG. 1.

Further, at the lower end portion of the extended guide 2, a pressurized working fluid supplying opening 2a is provided. The pressurized working fluid supplying opening 2a supplies pressurized working fluid in working fluid filling space S2 into the mist generating space S1 between the extended guide 2 and the long nozzle 3. The pressurized working fluid supplying opening 2a is a cylindrical hole penetrating the wall of the extended guide 2. The inner diameter of the pressurized working fluid supplying opening 2a is, for example, 0.2 to 0.5 mm. The pressurized working fluid supplying openings 2a are disposed at the same height. Two or more pressurized working fluid supplying openings 2a are provided at equal angular interval in the circumferential direction of the wall of the extended guide 2 with the tool electrode 1 at the center, as viewed in the vertical direction, that is, the longitudinal direction of the extended guide 2. In the present embodiment, as shown in FIG. 4, four pressurized working fluid supplying openings 2a are provided at every 90 degrees in the circumferential direction of the wall of the extended guide 2 with the tool electrode 1 at the center, as viewed in the longitudinal direction of the extended guide 2.

Figure 5:
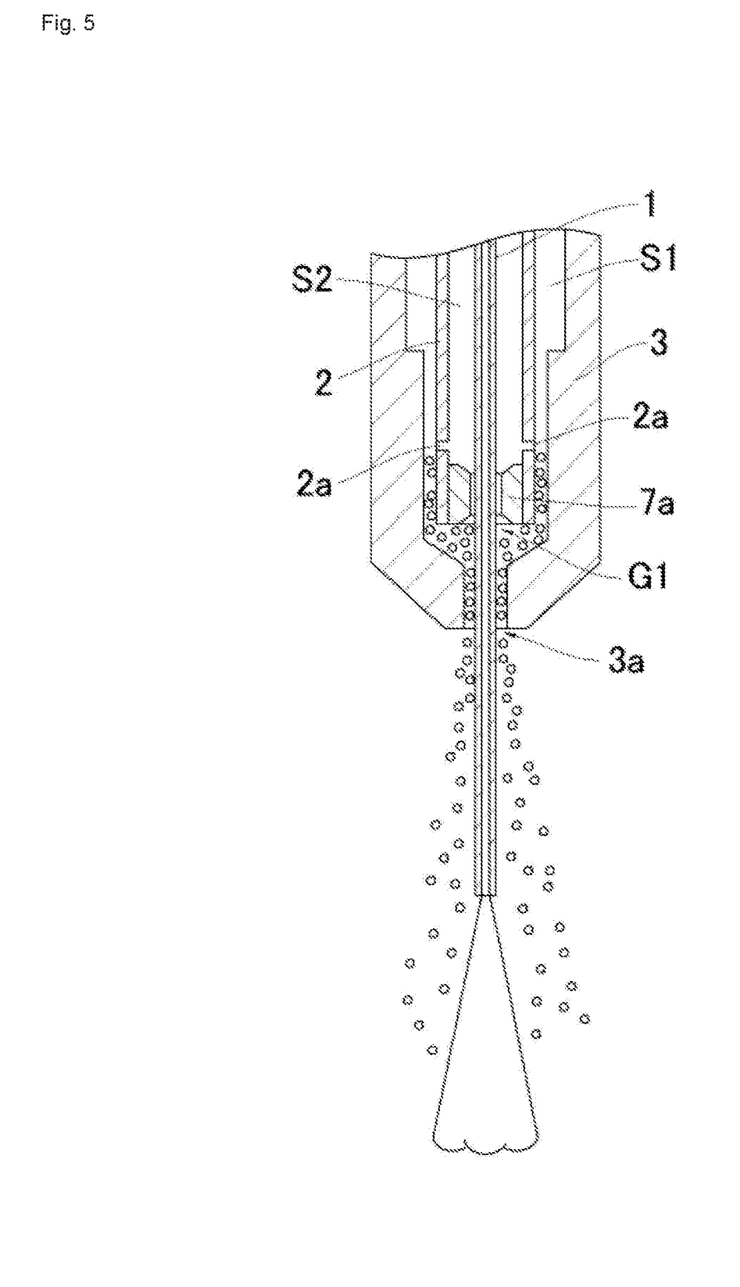
FIG. 5 is a cross-sectional view of a region A of FIG. 1.

As shown in FIG. 1, the long nozzle 3 has a substantially tubular shape. The long nozzle 3 is provided along the outer wall surface of the extended guide 2 so as to extend in the longitudinal direction of the extended guide 2 and to surround the extended guide 2. At the lower end of the long nozzle 3, the tool electrode 1 protruding from the lower end of the extended guide 2 is inserted, and a mist ejecting opening 3a is formed to eject the mist generated in the mist generating space S1. As described above, the pressurized working fluid is supplied from the pressurized working fluid supplying opening 2a and the first gap G1 which is between the first die 7a attached to the lower end of the extended guide 2 and the tool electrode 1, into the mist generating space S1. In the mist generating space S1, compressed gas is supplied from a compressed gas supplying opening 4c provided between the upper end of the long nozzle 3 and the extended guide 2 via the first flow path 4a in the housing 4. The mist generating space S1 has smaller cross-sectional area in the vicinity of the pressurized working fluid supplying opening 2a than the other positions in the vertical direction. More specifically, as shown in FIG. 5, by forming the long nozzle 3 to project toward the extended guide 2 in the vicinity of the pressurized working fluid supplying opening 2a, the distance between the long nozzle 3 and the extended guide 2 is close in that vicinity. Thereby, in the vicinity of the pressurized working fluid supplying opening 2a, the flow velocity of the compressed gas flowing downward can be rapidly increased.

As shown in FIG. 1, the housing 4 holds the extended guide 2 and the long nozzle 3. In the housing 4, the first flow path 4a is formed through which compressed gas flows from the compressed gas supplying device 5 into the mist generating space S1. In the housing 4, the second flow path 4b is formed through which pressurized working fluid flows from the pressurized working fluid supplying device 6 to the connecting path 2b of the extended guide 2.

The compressed gas supplying device 5 supplies compressed gas. The compressed gas is air. The pressurized working fluid supplying device 6 supplies pressurized working fluid. The pressurized working fluid is water.

Next, with reference to FIG. 1 and FIG. 5, mist generating at the electric discharge machining will be described in detail The compressed gas supplied from the compressed gas supplying opening 4c into the mist generating space S1 is accelerated in the vicinity of the pressurized working fluid supplying opening 2a where the cross-sectional area of the mist generating space S1 is reduced, and the compressed gas flows rapidly towards the mist ejecting opening 3a. Further, as described above, the size of the first gap G1 between the tool electrode 1 and the first die 7a is 0.0025 to 0.010 mm, and the inner diameter of the pressurized working fluid supplying opening 2a is 0.2 to 0.5 mm. That is, the cross-sectional areas of the supplying openings of the pressurized working fluid to the mist generating space S1 are all small. Therefore, the pressurized working fluid is ejected from the first gap G1 and the pressurized working fluid supplying opening 2a by the negative pressure generated in the mist generating space S1 due to the venturi effect, in addition to the forcible pressurization by the pressurized working fluid. The ejected pressurized working fluid is finely atomized by the compressed gas and is ejected as mist from the mist ejecting opening 3a.

Action and Effect

In the present embodiment, as described above, four pressurized working fluid supplying openings 2a are provided at every 90 degrees in the circumferential direction of the wall of the extended guide 2 with the tool electrode 1 at the center, as viewed in the longitudinal direction of the extended guide 2. Further, the pressurized working fluid supplying openings 2a have circular shapes having the same inner diameter each other and are disposed at the same height. Thereby, pressurized working fluid can be supplied into the mist generating space S1 uniformly. Like this, since the mist can be uniformly generated in the mist generating space S1 and can be ejected without deviation along the tool electrode 1, shavings in the vicinity of the tip of the tool electrode 1 where the electric discharge machining is performed are reliably removed.

Further, the tool electrode 1 is inserted in the working fluid filling space S2 in which the pressurized working fluid is filled. Therefore, the tool electrode 1 can be effectively cooled by the pressurized working fluid filled in the working fluid filling space S2. As a result, the temperature increase of the tool electrode 1 during electric discharge machining can be suppressed, and consumption of the tool electrode 1 can be suppressed.

Further, the pressurized working fluid supplying opening 2a and the first gap G1 are disposed below the compressed gas supplying opening 4c. Accordingly, the pressurized working fluid can be supplied into an air flow in which a stable flow is formed toward the mist ejecting opening 3a. As a result, the generated mist can be put in the air flow and can be stably ejected.

Further, dies 7a, 7b and 7c for supporting the tool electrode 1 are disposed at the upper end, the lower end, and the central portion in the longitudinal direction of the working fluid filling space S2 to surround the outer peripheral of the tool electrode 1. Therefore, it is possible to prevent deflection of the tool electrode 1 generated during the electric discharge machining. Thereby, the shift of a machining position can be prevented, and machining can be performed with high precision.

Further, the first gap G1 is provided between the first die 7a and the tool electrode 1, and the size of the first gap G1 is 0.0025 to 0.010 mm. As a result, the pressurized working fluid in the working fluid filling space S2 can be ejected into the mist generating space S1 from the first gap G1 between the tool electrode 1 and the first die 7a, and the pressurized working fluid can be used for mist generation. Further, since the pressurized working fluid can be ejected along the tool electrode 1, the tool electrode 1 projected from the lower end of the extended guide 2 can be cooled by pressurized working fluid, in addition to the cooling in the working fluid filling space S2.

Further, the second gap G2 is provided between the second die 7b and the tool electrode 1, and the size of the second gap G2 is 0.0025 to 0.010 mm. As a result, since pressurized working fluid can be ejected along the tool electrode 1, the tool electrode 1 projected from the upper end of the extended guide 2 can be cooled by pressurized working fluid, in addition to the cooling in the working fluid filling space S2.

Further, the third die 7c attached between the first die 7a and the second die 7b is provided on the outer wall surface with the notch 7c1 acting as the flow path of the pressurized working fluid. As a result, since the pressurized working fluid can flow downward through the notch 7c1, the flow of the pressurized working fluid toward the pressurized working fluid supplying opening 2a and the first gap G1 can be smoothed.

Further, the compressed gas supplied from the compressed gas supplying device 5 is air. As a result, machining can be performed at a certain speed or more, and the cost required for compressed gas can be reduced.

Further, the pressurized working fluid supplied from pressurized working fluid supplying device 6 is water. Thereby, cooling of the tool electrode 1 can be performed efficiently, and consumption of the tool electrode 1 can be suppressed. Moreover, the cost required for pressurized working fluid can be reduced.

Further, during the electric discharge machining, the tool electrode 1 is coaxially rotated by the rotary drive. As a result, it is possible to prevent deflection of the tool electrode 1 generated during the electric discharge machining. Moreover, the mist ejected from mist generating space S1 can be diffused more uniformly.

The preferred embodiments and examples of the present invention are described above, and the present invention is not limited to that. That is, various design changes can be made as long as they are described in the claims.

For example, in the present embodiment above, the tool electrode 1 is described as a pipe electrode, but the tool electrode 1 may be a rod-like electrode. Also, the hollow hole provided in the pipe electrode may be any number and shape.

Also, although pressurized working fluid supplying opening 2a is described as a cylindrical hole penetrating the wall surface of the extended guide 2, the hole may have any shape.

Also, although the compressed gas is described as air, the compressed gas may be, for example, oxygen, nitrogen, or argon.

Also, although the pressurized working fluid is described as water, the pressurized working fluid may be, for example, a water-soluble working fluid or an oil-based working fluid.

Also, the notch 7c1 formed on the third die 7c may have any shape as long as the pressurized working fluid can flow smoothly.

What is claimed is:

1. An electric discharge machining apparatus, comprising:
   a tool electrode that performs electric discharge machining to a workpiece;
   a tubular extended guide in which the tool electrode is inserted;
   a long nozzle in which the tool electrode is inserted with a tip protruded, and being provided along an outer wall surface of the extended guide so as to provide a mist generating space between the extended guide and the long nozzle;
   a compressed gas supply for supplying compressed gas into the mist generating space; and
   a pressurized working fluid supply for supplying pressurized working fluid into working fluid filling space between the tool electrode and the extended guide; wherein
   the extended guide includes pressurized working fluid supplying openings penetrating a wall of the extended guide,
   the pressurized working fluid supplying openings are disposed at equal angular interval in a circumferential direction of the wall, and
   the pressurized working fluid supplied from the working fluid filling space into the mist generating space through the pressurized working fluid supplying openings is mixed with the compressed gas in the mist generating space so that the pressurized working fluid is atomized to be ejected as mist.

2. The apparatus of claim 1, further comprising:
   a plurality of dies supporting the tool electrode; wherein a first die of the dies is disposed at an end in a longitudinal direction of the extended guide, which is a side from which the mist is ejected, so as to form a first gap between the tool electrode and the first die, so that the pressurized working fluid in working fluid filling space is ejected from the first gap.

3. The apparatus of claim 2, further comprising:

a plurality of dies supporting the tool electrode; wherein a second die of the dies is disposed at an other end in the longitudinal direction of the extended guide, which is an opposite side to the side from which the mist is ejected, so as to form a second gap between the tool electrode and the second die, so that the pressurized working fluid in working fluid filling space is ejected from the second gap.

4. The apparatus of claim 3, further comprising:

a plurality of dies supporting the tool electrode; wherein a third die of the dies is disposed between the pressurized working fluid supplying opening and an end in a longitudinal direction of the extended guide, which is an opposite side to a side from which the mist is ejected, and a notch is provided on the outer wall surface of the third die that acts as a flow path for pressurized working fluid.

5. The apparatus of claim 1, wherein the compressed gas is air.

6. The apparatus of claim 1, wherein the pressurized working fluid is water.

7. The apparatus of claim 1, wherein the tool electrode is configured to be coaxially rotatable.

* * * * *